US008655792B1

(12) United States Patent
Gauvin

(10) Patent No.: US 8,655,792 B1
(45) Date of Patent: Feb. 18, 2014

(54) DERIVING THE CONTENT OF A SOCIAL NETWORK PRIVATE SITE BASED ON FRIEND ANALYSIS

(75) Inventor: William Gauvin, Leominster, MA (US)

(73) Assignee: Symantec Corporation, Mountain View, CA (US)

(*) Notice: Subject to any disclaimer, the term of this patent is extended or adjusted under 35 U.S.C. 154(b) by 946 days.

(21) Appl. No.: 12/413,409

(22) Filed: Mar. 27, 2009

(51) Int. Cl.
*G06Q 10/00* (2012.01)

(52) U.S. Cl.
USPC ............................................. 705/319; 705/1.1

(58) Field of Classification Search
USPC ................................................ 705/319, 1, 1.1
See application file for complete search history.

(56) References Cited

U.S. PATENT DOCUMENTS

| 2003/0055711 | A1* | 3/2003 | Doherty | 705/10 |
|---|---|---|---|---|
| 2005/0210409 | A1* | 9/2005 | Jou | 715/811 |
| 2006/0085248 | A1* | 4/2006 | Arnett et al. | 705/10 |
| 2008/0172412 | A1* | 7/2008 | Gruhl et al. | 707/104.1 |
| 2012/0016953 | A1* | 1/2012 | Smith et al. | 709/217 |

OTHER PUBLICATIONS

Yakovlev, Ilya V., "Web 2.0: Is It Evolutionary or Revolutionary". IT Pro, Nov./Dec. 2007, p. 43-46.*

* cited by examiner

*Primary Examiner* — Gabrielle McCormick
(74) *Attorney, Agent, or Firm* — Fenwick & West LLP

(57) ABSTRACT

Content of a private profile/site of a user is derived based on analysis of the user's friend's profiles/sites. A mapping module maps a social networking group with a number of members. A pattern module determines a pattern of publishing activity of each of the members in posting content on sites of other of the members. A profiling module defines a member usage profile for each member based on the pattern. An identification module identifies a private site of a private member of the social networking group to be analyzed. An analysis module analyzes content posted by the private member on public sites of public members of the social networking group. A prediction module predicts responses of the public members to the content posted by the private member based on the member usage profiles of the public members. An estimation module estimates the type and amount of content posted on the private site based on the analysis of the public sites and the prediction based on the member usage profiles.

20 Claims, 6 Drawing Sheets

DERIVING THE CONTENT OF A SOCIAL NETWORK PRIVATE SITE BASED ON FRIEND ANALYSIS

BACKGROUND OF THE INVENTION

1. Field of the Invention

This invention pertains in general to managing privacy on public websites, and more specifically to deriving content of a social network private site based on analysis of the user's social networking friends.

2. Description of the Related Art

Social networking websites have opened up many new avenues to building a social network by allowing people to share information online and connect to a wide range of different users. Social networking websites, such as FACEBOOK®, MYSPACE®, and LINKEDIN®, allow users to build online profiles/sites including information about the users that can be made available to other users in the network. The user can typically post photos, send messages, comment on friends' sites, join user groups, and generally interact and build online communities of users who share common interests. The amount and types of information that can be shared in these social networking environments is vast, and a given user's network can grow over time as the user connects to more and more other users.

With this current social networking phenomenon, however, comes an increased focus on privacy concerns. Displaying personal information about yourself on a public website allows you to engage more actively in social networking. However, this also allows other potentially unwanted viewers to see your information and opens the door to various forms of privacy violations. Many social networking websites permit a user profile site to be marked "public" or marked "private," or otherwise allow the user to limit who can see his information. In this manner, a user can allow his site to be made available on the social networking website to anyone who visits the site (a public site) or can choose to only let the people he approves as "friends" view his site (a private site).

Yet, there are many reasons why it may be useful to have some access to these private sites or to know more about the patterns of networking their users are employing. For computer security purposes, including detection of spam or malicious activity on a website, it is often necessary to learn more about social networking activity. However, without any information on the networking activity of private site users, it is impossible to get the full picture that may be needed to provide proper security.

Further, with more and more children connecting via social networks, there is an increased risk that important and potentially sensitive information will be released. People, being sometimes naïve to the negative impact of sharing too much information about themselves or their families, may be compromising their own privacy. Even on supposedly private sites, people sometimes share confidential details with their "friends." While it is possible for others to see what information is being shared on public profiles, there is no way to understand what may be occurring on private profiles. Knowing more about the social networking activity of private profile users, thus, could be helpful in this regard.

Social networking websites also have an interest in gathering more information about private users. To provide better services and continue to upgrade their features, it is helpful to gather information about the social networking activities in which users are engaged. To understand the full picture, however, social networking services must also have an understanding of what private users are doing.

Therefore, there is a need in the art for a solution that provides a way to learn about the content of private sites.

DISCLOSURE OF INVENTION

The above and other needs are met by a method, computer-implemented system, and computer program product for estimating content of a private site on a social networking website. An embodiment of the method comprises identifying a private site of a private member of a social networking group to be analyzed, where the social networking group has a number of members. The method also includes analyzing content posted by the private member on public sites of public members of the social networking group. In addition, the method includes predicting responses of the public members to the content posted by the private member based on member usage profiles of each of the public members. The member usage profiles indicate patterns of publishing activity of the public members in posting content on sites of other members over a period of time. The method further includes estimating content posted on the private site based on the analysis of the public sites and the prediction based on the member usage profiles. In some embodiments, the method includes mapping the social networking group using an algorithm (e.g., the Kleinberg algorithm). In these embodiments, the method also includes determining the patterns of publishing activity of each of the members, and defining the member usage profiles for each of the members based on the determination of the patterns.

In an embodiment of the system, an identification module identifies a private site of a private member of a social networking group to be analyzed, where the social networking group has a number of members. An analysis module analyzes content posted by the private member on public sites of public members of the social networking group. A prediction module predicts responses of the public members to the content posted by the private member based on member usage profiles of each of the public members. The member usage profiles indicate patterns of publishing activity of the public members in posting content on sites of other members over a period of time. An estimation module estimates content posted on the private site based on the analysis of the public sites and the prediction based on the member usage profiles. In some embodiments, a mapping module maps the social networking group using an algorithm (e.g., the Kleinberg algorithm). In these embodiments, a pattern module determines the patterns of publishing activity of each of the members, and a profiling module defines the member usage profiles for each of the members based on the determination of the patterns.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
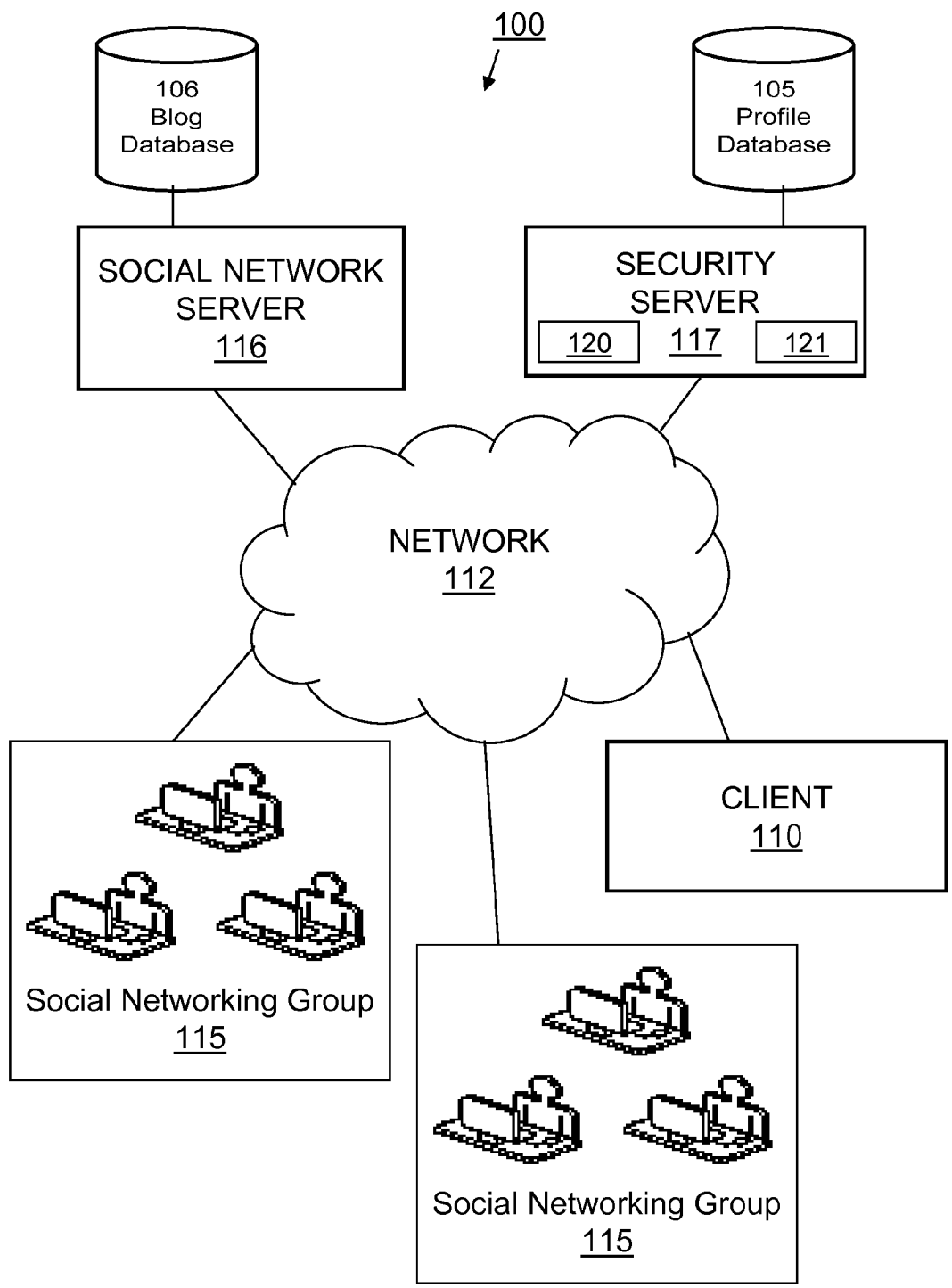
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a social network server 116, a security server 117, a client 110, and social networking groups 115 connected by a network 116. Only two social networking groups 115 and only one client 110 are shown in FIG. 1 in order to simplify and clarify the description. Embodiments of the computing environment 100 can have thousands or millions of social networking groups 115 and clients 110, as well as multiple servers 116. In some embodiments, the clients 110 are only connected to the network 112 for a certain period of time or not at all.

The social network server 116 and the security server 117 both serve information or content to clients 110 via the network 112. The term "content" is used in this application to refer to anything that can be on a page, for example, text, images, objects, links to other content, blog comments or postings on a wall/page, notes pages, profile information, information about other users of the social networking environment, and so forth. In one embodiment, the social network server 112 is located at a website provided by a social networking service (e.g., FACEBOOK®, MYSPACE®, LINKEDIN®, etc.), although the server can also be provided by another entity. In one embodiment, the security server 117 is located at a website provided by SYMANTEC CORPORATION, although the server can also be provided by another entity. The servers 116, 117 can each include a database storing information and a web server for interacting with clients 110. As shown in FIG. 1, the security server 117 includes a profile database 105 for storing user/member profiles, social networking group profiles, spam profiles, etc. The servers 116, 117 can send information across the network 112 to each other or to the clients 110. For example, the social network server 116 can provide social networking information, such as information on user sites for a security review to the security server 117. In some embodiments this information is sent in response to a request by the security server 117. In other embodiments this information is pushed by the social network server 116 to the security server 117. The social networking groups 115 can access their social networking pages provided by the social network server 116.

The social networking groups 115 illustrated in FIG. 1 are groups of individuals that network together socially. These social networking groups 115 are subsets of users within a social networking environment (e.g., all of the users of social networking services provided by social networking websites, such as FACEBOOK®). These individuals can interact on social networking websites, which allows them to create online profiles or sites, communicate with one another, upload photos, post comments on blogs, etc. The social networking groups 115 are defined using an algorithm, as explained in more detail below. In some embodiments, the social networking group 115 includes users of a social networking service that are linked together as "friends" (e.g., where the service requires that both users confirm they are friends to view each others' personal sites). In other embodiments, the social networking groups 115 include subsets of the "friends" group, or other groups in which one or more of the members are not connected as "friends."

The clients 110 are computers or other electronic devices that can interact with the server 116, 117 or other clients 110. The clients 110, for example, can be personal computers executing a web browser that allows the user to browse and search for information available at a website associated with the server. In other embodiments, the clients 110 are network-capable devices other than a computer, such as a personal digital assistant (PDA), a mobile telephone, a pager, a television "set-top box," etc. The clients 110 preferably execute an operating system (e.g., LINUX®, one of the versions of MICROSOFT WINDOWS®, and PALM OS®), which controls the operation of the computer system, and executes one or more application programs. The clients 110 can perform activities and make requests for or otherwise acquire information from the server 116, 117, or other computers 110. In one embodiment, users of the social networking groups 115 use clients similar to client 110 to access the social networking website via the social network server 116, and can post content on their personal sites or on the sites of others using the clients 110. As used herein, the term "site" refers to a user's personal site or profile for a social networking website, including the locations at which information can be posted on commented on (e.g., the user's walls, pages, blogs, notes pages, bulletins, etc.), the information the user provides about himself, his photos, and any other information a user might typically post on a social networking website.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), Java™, ColdFusion Script (CF-Script), .NET, etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the security server 117 executes a profiling engine 120 for mapping social networks and creating usage profiles. The server 117 also executes a content engine 121 for deriving content on private sites. The engines 120, 121 can be discrete application programs, or can be integrated into another application program or the operating system for the server 117. In some embodiments, the engines 120, 121 are provided on a cloud service acting as a server. In some embodiments, a portion of one or both of the engines 120, 121 (or the entire engine) is executed on the server 116 or on the clients 110. In still other embodiments, one or both of the engines 120, 121 are executed on the social network server 116 which then acts as the security server as well as the social network server 116. Thus, in these embodiments, the computing environment 100 includes only one server that performs the functions of both servers.

The profiling engine 120 maps various different social networking groups 115 of a social networking environment. For example, the engine 120 can apply an algorithm to identify the users who make up a social networking group 115. The groups 115 shown in FIG. 1 illustrate only three users, but there can be many users in each social networking group 115. The engine 120 further determines patterns of activity associated with members of the social networking groups. For example, the engine 120 can determine patterns of the members in posting information on blogs of other of the members. As used herein, the term "blog" refers to any type of weblog or page on which users can write or post information/comments, including a user's site, walls or pages of a user's site, notes pages, social networking bulletins, and so forth. The engine 120 creates usage profiles based on the patterns observed (e.g., member usage profiles). The engine 120 can store these profiles in the profile database 105, which can then be used in content determination by the content engine 121.

It is very difficult to ascertain the content of a private profile site without the permission of the owner. Being private however does not prevent the owner from writing content that appears on the sites of his "friends" (other members of his social networking group) whose sites can be marked public. Usually the interaction of a private member with his friends does not change based on whether the friends' sites are marked public or private. Similarly, the friends can write on each others' public sites. The engine 121 can thus estimate the content of a private site based on the normal writing patterns of the private member who owns that site, and based on other members of her social networking group. The engine 121 mirrors the content of public social networking sites to the private site.

The content engine 121 can review what the private member tends to write on his friends' sites to estimate what might be on the private member's own site. The engine 121 reviews the content or topics of the discussions the private member is having with the public members based on the private member's postings on the public sites. From this, the engine 121 can predict that there are likely replies from the public members on the private member's site on the same topics. For example, private member Amy can communicate with public member Tom who is in the same social networking group as Amy. Though the engine 121 cannot see what is included on Amy's site, the engine 121 can see Tom's site. In conversing with Tom, Amy will post content on Tom's wall. From Amy's postings, the engine 121 can determine that Amy is having a conversation with Tom about their high school dance coming up next week. The engine 121 can thus determine Amy's site likely includes responses from Tom on that same topic, and may be able to generally estimate what Tom wrote back based on Amy's postings.

The content engine 121 can also review member usage profiles for the public members. The usage profile for a member can provide information about what that member tends to write on other members' walls, how much content he generally writes, the amount of time spent writing, the times of day when the member tends to write, the general topics he tends to write about, his typical writing style, and so forth. Using this information, the content engine 121 can make further predictions about what that member has written on private sites based on his usual writing patterns. For example, returning again to private member Amy and public member Tom, the engine 121 can review Tom's member usage profile indicating how Tom has interacted with other public members in the past. The usage profile might indicate that Tom tends to generally write one to two sentence replies to what other members post on Tom's wall. The engine 121 can thus determine that the replies from Tom on Amy's wall are probably one to two sentences in length. Using this information, the engine 121 can estimate the likely amount of content on Amy's wall from Tom (or from other public members based on their usage profiles).

In some embodiments, the engines 120, 121 allow an entity, such as a supervisor, to learn more about the private profile of another person. The "supervisor" can be any person who would like to estimate the content of a private site. In one embodiment, the supervisor is a parent of the private member. In this embodiment, the engines 120, 121 can be included in a parental control product that allows parents to review the type and amount of content shared by their children on the social networking website. The engines 120, 121 can be used by parents to track private sites of their children and their friends. The engines 120, 121 are also useful for providing an estimate of the content in a private site without providing exact details of what the site includes. For example, Amy's parents may not want to learn detailed information about Amy's private site, but instead might only care about being informed if Amy is discussing drugs with other members of her group. The engines 120, 121 can thus provide Amy's parents with an estimation of the type of content on Amy's site and the topics of discussion. The supervisor can also be any other entity providing a supervisory role for the private member (e.g., other family members, a work supervisor, a friend, etc.).

In some embodiments, the engine 121 is used in providing security, spam detection, etc. on a social networking website. In these cases, the supervisor is the entity interested in esimtating the content of the private site for providing better security. The engine 121 can also be used by the social networking website for learning about its members to provide better service and more features. In fact, the engine 121 can be used for any other function for which it is useful to learn information about private sites.

As stated above, in some embodiments, one or both of the engines 120, 121 run on the client 110. Where processing power and bandwidth are limited, only a portion of the social networking environment will be mapped and analyzed on the clients 110. For example, where the engines 120, 121 are executed on a client 110, the profiling engine 120 might only map the social networking group 115 for the user of the client 110, and might determine patterns of usage and group profiles for the user's own social networking group 115.

Figure 2:
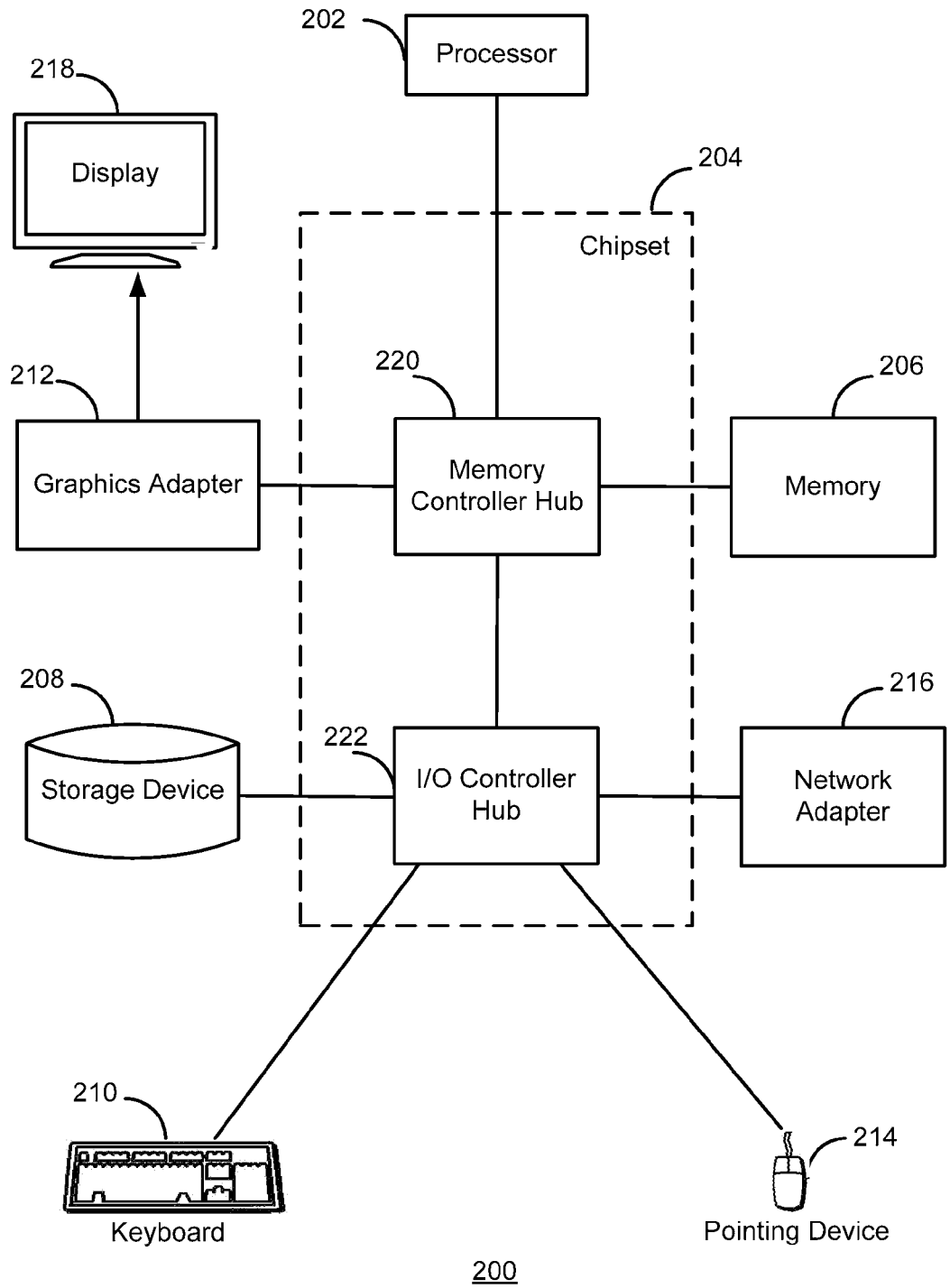
FIG. 2 is a high-level block diagram illustrating a computer system 200 for use with the present invention.

FIG. 2 is a high-level block diagram illustrating an example of a computer 200 for use as a server 116 and/or client 110.

Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 112. Some embodiments of the computer 200 have different and/or other components than those shown in FIG. 2.

The computer 200 is adapted to execute computer program modules for providing functionality described herein. As used herein, the term "module" or "engine" refer to computer program instructions and other logic used to provide the specified functionality. Thus, a module/engine can be implemented in hardware, firmware, and/or software. In one embodiment, program modules/engines formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3A:
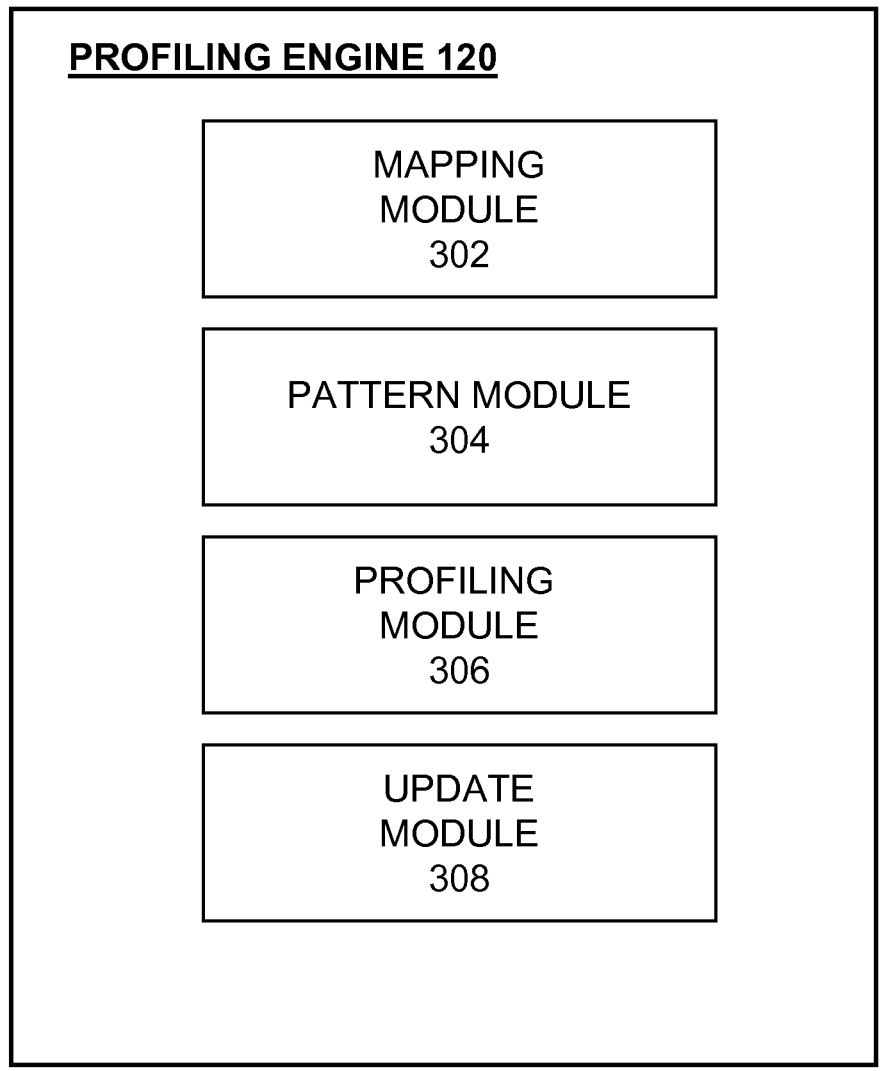
FIG. 3a is a high-level block diagram illustrating the functional modules within the profiling engine 120, according to one embodiment of the present invention.
Figure 3B:
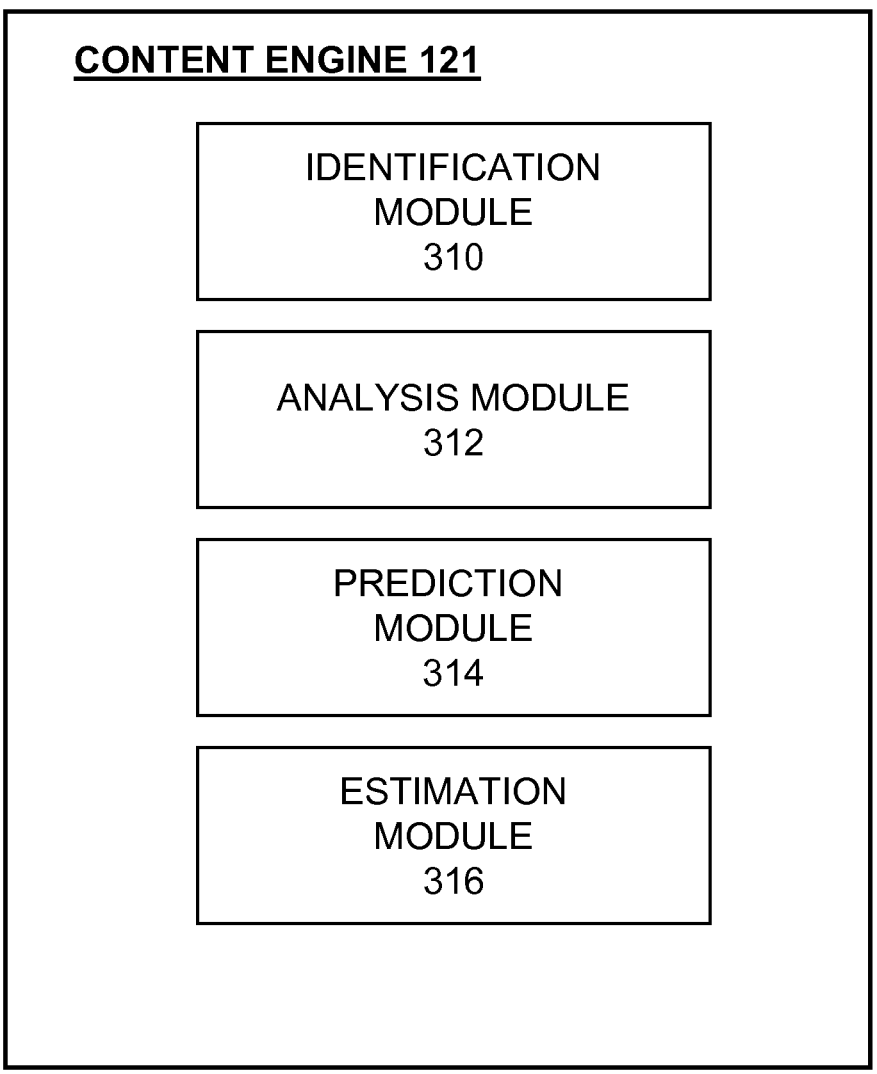
FIG. 3b is a high-level block diagram illustrating the functional modules within the content engine 121, according to one embodiment of the present invention.

FIGS. 3a and 3b are high-level block diagrams illustrating the functional modules within the profiling engine 120 and content engine 121, respectively, according to one embodiment of the present invention. The profiling engine 120, in the embodiment illustrated in FIG. 3a, includes a mapping module 302, a pattern module 304, a profiling module 306, and an update module 308. The content engine 120, in the embodiment illustrated in FIG. 3b, includes an identification module 310, an analysis module 312, a prediction module 314, and an estimation module 316. Some embodiments of the profiling engine 120 and the content engine 121 have different and/or additional modules than those shown in FIGS. 3a and 3b, and the other figures. Likewise, the functionalities can be distributed among the modules in a manner different than described herein or can be incorporated into a single module. Certain modules and functions can be incorporated into other modules of the engines 120, 121, and/or other entities on the network 112, including the server 116 or client 110.

The mapping module 302 defines subsets of a social networking environment, referred to here as "social networking groups" 115. These subsets are users that belong to the same social networking "circle" and are commonly named "friends." There are often several levels of friendships in a social network. Active participants are those who generally write to the wall (site) of other members, and voyeurs are those who generally only view sites, but post little or no content to sites, blogs, walls, etc.

The module 302 can apply an algorithm to define social networking groups 115. In one embodiment, the module 302 randomly selects a central user for whom the social networking group 115 will be defined. Using techniques, such as the Kleinberg authoritative/hub algorithm, the social networking group 115 for the central user can be ascertained. The algorithm can be used to perform traffic analysis on the level of activity on the walls. Many social networking websites, such as MYSPACE®, provide the ability for viewing of all "public" sites. Other social networking websites require membership into the website before allowing the viewing of any sites. In both environments, an algorithm, such as the Kleinberg algorithm, adjacency list, or other algorithms, can be used to derive a social networking group 115.

In an embodiment in which the Kleinberg algorithm is used to map the social network, the technique uses a modification to the Kleinberg algorithm, which provides an incremental weight specifically for each blog entry and doubles the weight when the communication is bi-directional between members. This technique ensures that members that correspond with each other more often will move to the top, creating high degrees of association between these members. The association can also be time sensitive (e.g., based on the time/date frequency of the post).

For the purpose of illustration, an example of how the module 302 can use the Kleinberg algorithm to map a social network is provided here. The Kleinberg algorithm is used here to identify the members of a social networking group 115. The algorithm determines how users are connected, where stronger connections are found between users that link to each other or tend to communicate with each other frequently. The Kleinberg algorithm defines two different classes of importance, called "hubs" and "authorities," and the algorithm is used to automatically recognize leading hubs and authorities in a network of users. Hubs and authorities exhibit a mutually reinforcing relationship, and this relationship can be ascertained using in-degree and out-degree measurements on both endpoints. In this manner, the algorithm can be used to rank relationships in a social network.

The module 302 can scan a user's site, and then the sites of all "friends" and those friends' "friends" to create a complete relationship map. In some embodiments, the users are given the option to opt in to the analysis performed by the content engine 121. In this case, users can provide password or ID information to the profiling engine 120 so the engine can scan the users' sites. The Kleinberg algorithm uses blogs or walls of social networking websites as the endpoint of analysis. The implementation of the algorithm is predicated on the use of a directed graph with directed edges $(p,q) \in E$ that represents the presence of a link from p to q, which are the vectors (nodes) from source to destination that correspond to the publisher of a blog entry p and to the site/blog owner q via the presence of a blog (link) E. The out-degree of p is the number of user sites it has links to (e.g., number of blogs posted on individual profile sites); the in-degree of p is the number of links to it from another site (e.g., number of blogs contained/posted within profile/site of p from other members of the social network). This is commonly referred to as the endorsement of p and q, and when it is bi-directional, it is mutually endorsing.

The basic premise of the algorithm is to isolate small regions, such that $P \subset V$ is a subset of user sites, in which G [P] denotes the graph induced on P (it's user site blogs and the content within) that corresponds to the link and strength of the relationship between two user sites. P represents the results of all the top level profiles after the Kleinberg/endorsement algorithm is executed. This P has a relationship with V, in that it has the highest "scores" or endorsement (e.g., based on some range entered in the algorithm). For example, starting with a social network that has 100 users, if 50 of those users never post blogs, they are quickly removed from the group P. Furthermore, 25 members might only post once and then are not active, so they too are quickly removed from P because they do not meet the "score" or threshold hold criteria. What is left is a group P of 25 members that are strongly tied. G[P] is the graph produced by this relationship.

The symbol σ is used to represent the blog content which is parsed to obtain the directed graph relationships. Specifically, users' sites on a social networking website are each assigned site IDs. This site ID is parsed and this ID is used to obtain additional user site relationships which are then analyzed. Using this technique, authoritative pages are obtained by analysis based on the blog "link structure." The main result of this analysis is to identify a set $Q_\sigma$ of all user sites containing an association based on publishing an entry in a blog using the site ID as the link between two sites. This link is also used during link-count analysis; the more blogs entered under a specific ID (link), the stronger the relationship. The results of using this technique are that (1) $Q_\sigma$ is a relatively small set, (2) $Q_\sigma$ is rich in relevant user sites, and (3) $Q_\sigma$ contains most of the strongest authorities.

The algorithm, as identified by Kleinberg, defines a parameter t, which is the size of the set to be derived by analysis. The idea is to create a collection of the highest ranked user sites from a "query" (the results from a parse operation on a specific user blog). This t then becomes the root set of $R_\sigma$, and it is from the root set that $P_\sigma$ will be derived, satisfying the three numbered items listed above. Thus, $P_\sigma$ is the final set of profiles (e.g., as identified by user IDs) after a filtering process. The filtering algorithm limits the size of the set to a specific value. This filtering process may not be used all the time, e.g., when the sets are relatively small. It typically is used on large social networks (e.g., the profile/site of a popular band on MYSPACE®).

Kleinberg's sub-graph algorithm is modified to create the social networking relationship graph. The algorithm is the following:

Subgraph (σ,E,t,d)
σ: Blog content that is scanned and parsed
E: Text based scanning and parsing engine
t,d: Natural numbers
Let $R_\sigma$ denote the top t results of E on σ
Set $P_\sigma = R_\sigma$
For each site p∈$R_\sigma$
    Let $\Gamma^+(p)$ denote the set of all sites p points to
    Let $\Gamma^-(p)$ denote the set of all sites pointing to p
    Add all sites $\Gamma^+(p)$ to $P_\sigma$
    if $\Gamma^-(p) \leq d$ then
    Add all sites in $\Gamma^-(p)$ to $P_\sigma$
    Else
    Add an arbitrary set of d pages from $\Gamma^-(p)$ to $P_\sigma$
End
Return ($P_\sigma$)

The result of the sub-graph routine is a graph, such that $G[P_\sigma] = G_\sigma$.

The goal of the algorithm is to iteratively update the site weights to establish the hub/authorities relationship. Two weight values are used, the non-negative authority weight $x^{<p>}$ and a non-negative hub weight $y^{<p>}$, which are both normalized so their squares sum to 1. This relationship is summarized below:

$$\Sigma_{p \in P_\sigma} (x^{<p>})^2 = 1$$

and $$\Sigma_{p \in P_\sigma} (y^{<p>})^2 = 1$$

The larger the x and y values, the better/stronger the relationship between the authorities and hubs. The general property for these values is the following: (1) if p points to many sites with a large x-value, then it should receive a large y-value, and (2) if p is pointed to by many sites with a large y-value, then it should receive a large x-value.

This property is specified using the following operation definitions:
An I operation such that:

$$x^{<p>} \leftarrow \sum_{q:(q,p) \in E} y^{<q>}$$

And the O operation:

$$y^{<p>} \leftarrow \sum_{q:(p,q) \in E} x^{<q>}$$

Both operations are used to reinforce each other. The iteration process can then be defined within the following function:

Iterate(G,k)
G: a collection of n linked site pages
k: a natural number
Let z denote the vector $(1, 1, 1, \ldots, 1) \in \Re^n$ (the base or initialization set for x and y)
Set $x_0 := z$
Set $y_0 := z$
For I=1, 2, . . . , k
    Apply the I operation to ($x_{i-1}$, $y_{i-1}$), obtaining a new x-weights $x_i'$;
    Apply the O operation to ($x_i'$, $y_{i-1}$), obtaining a new y-weights $y_i'$;
    Normalize $x_i'$, obtaining $x_i$
    Normalize $y_i'$, obtaining $y_i$
End
Return ($x_k, y_k$)

This result can further be filtered to obtain the largest authorities and hubs. As the number of iterations increase, as specified by the input value k, the sequence of vectors returned by the Iterate function converge to a fixed point, x* and y*. A k value of 20 is generally sufficient for each vector to become stable.

Using Kleinberg's algorithm, an initial index point is identified. The start point is an entry in a blog, and each user's blog that is referenced by that initial blog is scanned using the Kleinberg constraints: (1) the user must have posted comment on a blog, and (2) the number of users is limited to the set $Q_\sigma$ which prevents the scan list from growing too large. The result is the mapping of social networking groups 115 defined by the mapping module 302.

Referring again to FIG. 3a, the pattern module 304 determines the patterns of publishing activity of each of the members in posting content on sites of other of the members over a period of time. The module 304 tracks the writing of each member of the group on another member's blog or wall. Over time, the module 304 can determine specific usage patterns for the members. For example, if it is a group of high school friends, the publishing activity throughout the day might be the highest during lunchtime, right after school gets out, in the evenings, etc. For an older group of friends, publishing activity might only be high later in the evening after the members have gotten home from work. Similarly, there can be different patterns for different days of the week (e.g., higher activity on weekends than weekdays). Patterns can also differ for different months of the year. For example, in the fall months, activity might be higher for members of the group (e.g., 15 minute to one hour or more spurts of writing activity amongst members), while writing activity can be less in the summer (e.g., members may not respond for a day or more). In addition, the members might have different patterns over holiday times (e.g., less writing before or after the holidays, but more writing during certain holidays). The module 304 can thus determine these patterns for each member, and the patterns can be different for different members.

In some cases, a pattern can be embodied as a mathematical function, set of rules, fuzzy logic algorithm, or a probability distribution that models the behavior of a member. For example, a pattern regarding common times of blog postings could be a frequency distribution over the times of day that users tend to be actively posting blog entries. As another example, a pattern on blog frequency-by-concept could be an observation-based rule that members always include the concept of religion when they post on Sunday.

In some embodiments, the pattern module 304 further determines other patterns, such as patterns of the whole social networking group 115 determined by the mapping module 302, or patterns of global publishing activity of users in the social networking environment. Similar to the patterns described above, there can be overall group/global patterns during holidays, during different times of the year, during different days of the month or week, during different times of day, etc. These patterns can be used to provide additional information regarding what content might be present on a private user's site. For example, a group pattern that indicates that the particular social networking group 115 tends to post a lot of content on Saturdays can be used to infer that the private site has a lot of Saturday content.

The profiling module 306 defines the member usage profiles for each of the members based on the determination of the patterns of publishing activity. When a user posts an entry on a blog, that entry persists. Using this aspect and applying traffic analysis, profiles can be created that identify patterns of use for the members. In many cases, this pattern can be derived by analyzing years of activity, and that activity can be categorized. Based on the information acquired by the pattern module 304, the profiling module 306 creates one or more profiles for each member. The profile(s) are created to represent the content-writing patterns of the group throughout the year, and so can account for different patterns throughout the day, week, month, year, during holidays, etc.

In one embodiment, patterns of use are represented in binary form for easy comparison to other profile use patterns.

In some embodiments, the profiles include information about one or more of the following:
  1. Time/date of publishing
  2. Delta between publishing
  3. Time/date of response from owner of site
  4. Time/date of next publishing (from any site within the social networking group)
  5. Content signature match between posts from the same and different individuals.
  6. Content type match between posts from the same and different individuals
  7. Clustering of "Holiday" categories (group and global)
  8. Clustering of "event" categories (group specific)
  9. Work/Leisure reference times (to include work, vacation, off hours, late hours with generally low activity)
  10. Gender and age correlation of activity.

In some embodiments, the profiling module 306 further defines one or more group or global usage profiles based on patterns of group/global publishing activity of users (determined by the pattern module 304). These profiles represent the patterns for a group or an overall social network, including different patterns at different times. For example, the global profiles can include a holiday usage profile defining typical usage patterns for the users of the social networking environment during holidays.

The update module 308 updates the member usage profile(s) to include new usage patterns of the members of the social networking group identified over time. Similarly, the module 308 can update any other profiles created by the profiling module 306. Since users may change their patterns in writing on walls of others over time, the module 308 recognizes these changes and updates the profiles. Over time, the profiles are thus adapted to represent new trends in social networking groups, and in the overall social networking environment.

Referring now to FIG. 3b, the identification module 310 identifies a private site of a private member of a social networking group to be analyzed. The social networking group typically includes a number of members. The group is defined as described above by the mapping module 302. The module 310 identifies a private site about which it would be helpful to learn more information. For example, the private site identified by the module 310 might be Amy's private site, about which Amy's supervisor (e.g., her parents) would like to learn more information. Similarly, the social networking website or its security system might need to learn more information about Amy's site in the interest of enforcing better security, spam detection, etc. In addition, knowing about Amy's site can be useful in ascertaining the "health" of the social networking group based on the analysis of the public sites. For example, an "unhealthy" group might be a young group of users that are talking about alcohol, drugs, adult content, sharing adult pictures, discussing topics that indicate depression or unhappiness of members, and so forth.

The analysis module 312 analyzes content posted by the private member on public sites of public members of the social networking group. In some embodiments, the analysis module reviews conversations that the private member is having with those public members. The module 312 can also determine topics of the conversations, where the topics indicate the type of content likely included in responses from the public members on the private site. For example, the analysis 312 module can track private member Amy and her conversations with public members of her group. The module 312 cannot see what comments are posted on Amy's site because it is private. However, the module 312 can monitor what Amy writes back on the public sites. This information will indicate generally what are the topics of conversations that Amy is having with these other members, what type of information she is revealing, etc. Reviewing a string of responses from Amy on Tom's public site will provide guidance regarding what were Tom's responses on Amy's site. The analysis by the module 312 thus allows the engine 121 to build a representation of what content is contained in that private site.

The prediction module 314 predicts responses of the public members to the content posted by the private member based on member usage profiles (created by the profiling module 306) of each of the public members. The member usage profiles indicate patterns of publishing activity of the public members in posting content on sites of other members over a period of time. For example, Tom's member usage profile can indicate that Tom typically posts only a sentence or two in his replies to other members, he generally responds in the evenings, he usually spends about an hour writing to other members, he responds less frequently during the summer, he typically talks about high school issues, school dances, school projects, who is dating who at his high school, etc. Tom's member usage profile provides the module 314 with a good idea of what Tom has likely posted on Amy's private site, how long the postings are, when he responded, etc.

In some embodiments, the module 314 reviews the member usage profiles to determine the amount of content typically posted by each of the public members on other sites, and so determines the amount of content likely included in the responses of the public members posted on the private site. Again, Tom's usage profile indicates how much content he typically writes back in a response and the length of time he spends writing on a given member's wall. From this, the module 314 can predict the amount of content on Amy's site that was posted by Tom.

As explained above, in some embodiments, the profiling module 306 creates a number of different profiles. For example, there can be one or more group usage profiles indicating typical patterns of usage amongst a social networking group. The group usage profile(s) can also be used by the module 314 in predicting information about a private site. For example, the group usage profile(s) for Amy's group can indicate the overall groups' response times, response lengths, response topics, etc., which can then be used in predicting information about Amy's site. The global usage profile(s) can indicate, for example, holiday usage patterns of the social networking environment, where members tend to post more information and spend more time posting around Christmas and Thanksgiving.

The estimation module 316 estimates the content posted on the private site based on the analysis of the public sites and the prediction based on the member usage profiles. As explained above, the analysis module 312 analyzes the private member's (e.g., Amy's) posts on the public sites of public members (e.g., Tom, and other public members of Amy's group). The analysis module 312 can thus determine the general topics of the conversations that Amy has had with her public friends. From this analysis, the estimation module 316 can determine what is the overall type of content that is likely posted on back on Amy's private site by the public members.

As explained above, the prediction module 314 reviewed the member usage profiles of public members (e.g., Tom and others) in the private member's (e.g., Amy's) social networking group. From these usage profiles, the module 314 was able to determine the amount of content that Tom typically posts in his replies to other public members. The estimation module 316 can thus use this information to estimate the overall amount of content on Amy's site. For example, the module 314 can also predict the amount of content on Amy's site that was posted by Jennifer, Fred, and Linda (based on each of their member usage profiles). Using this information, the estimation module 316 can estimate the overall amount of content/responses on Amy's site. The module 316 can thus build an estimated site for Amy, including an estimation of type and amount of content. The estimation module 516 can provide the estimated site or report of the estimated site to a supervisor of the private member or other entity interested in the private site content.

In some embodiments, the estimation module 316 clusters events together, such as clustering together conversations between the private member and the public members. The module 316 can then statistically analyze the clustered conversations for topics of discussion and amount of information shared in the conversations. In some embodiments, the module 316 determines a median level of conversations amongst public members of the group (e.g., lots of conversations, or only a few) and categories of information included in the conversations (e.g., high school dances, school projects, etc.). In some embodiments, the module 316 estimates the number of bytes, images, or objects included in the public profiles. The module 316 can also estimate when responses were written to the private site, when conversations on a topic started and stopped, what types of photos are posted on the private site, what information the private site reveals about its owner, whether the private site contains discussions on inappropriate topics or uses certain key words (e.g., drugs), etc.

Figure 4:
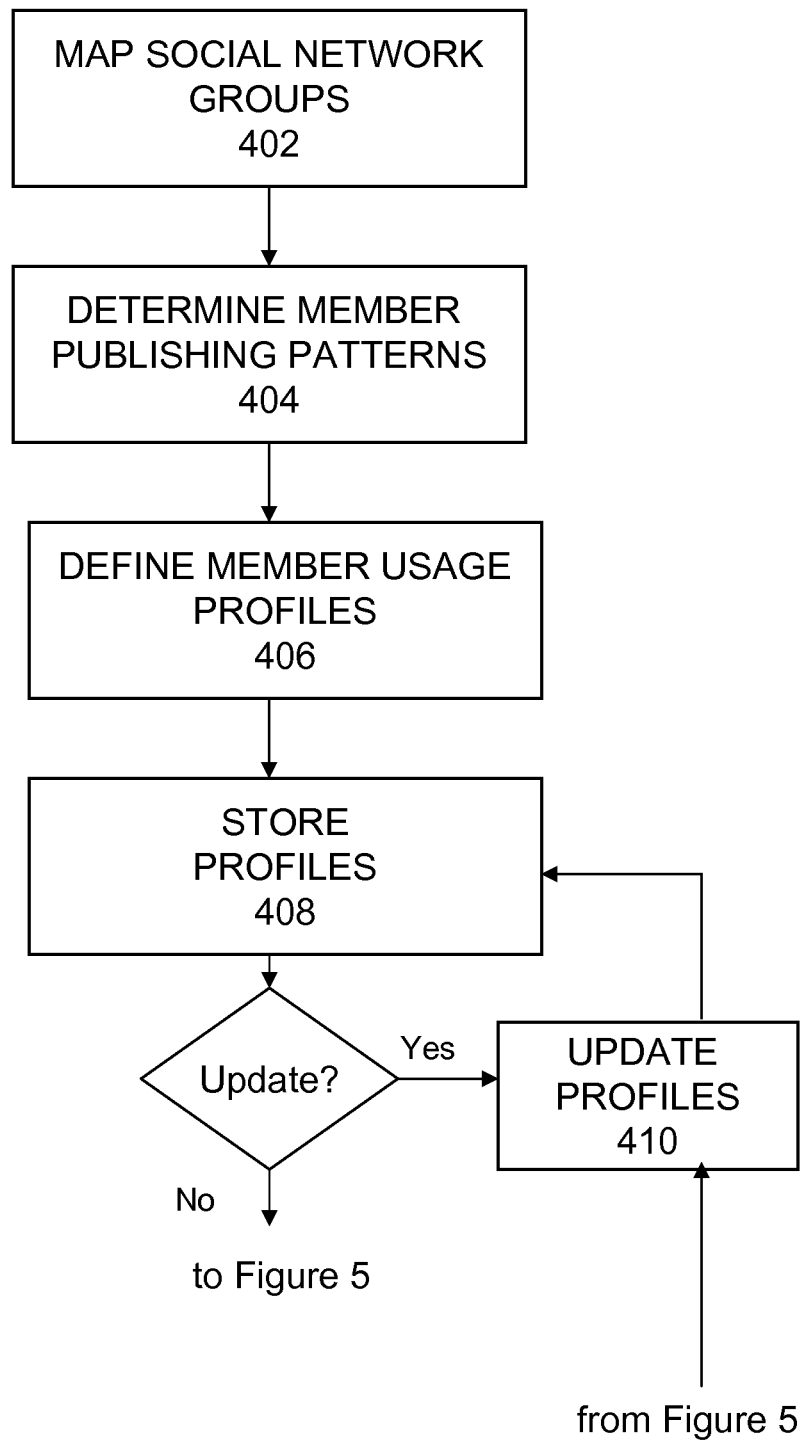
FIG. 4 is a flowchart illustrating steps of the profiling engine 120 performed to map the social network and create usage profiles, according to one embodiment of the present invention.

Referring now to FIG. 4, there is shown a flowchart illustrating the operation of the profiling engine 120 in mapping the social network and creating usage profiles, according to some embodiments of the present invention. It should be understood that these steps are illustrative only. Different embodiments of the profiling engine 120 may perform the illustrated steps in different orders, omit certain steps, and/or perform additional steps not shown in FIG. 4 (the same is true for the content engine 121 method steps described in FIG. 5). As explained above, in some embodiments, the functions of the engines 120, 121 are performed by a single engine or module.

As shown in FIG. 4, the profiling engine 120 maps 402 the social networking group comprising the plurality of members (e.g., using an algorithm). The social networking group 115 is a subset of users within a social networking environment. The profiling engine 120 then determines 404 the patterns of publishing activity of each of the members in posting content on sites of other of the members over a period of time. As explained above, the engine 120 can also determine 404 group or global patterns of activity, as well. The engine 120 defines 406 the member usage profiles for each of the members based on the determination 404 of the patterns of publishing activity. In some embodiments, the engine 120 also defines group or global usage profiles.

Once the profiles are defined 406, the engine 120 can store 408 the profiles in the profile database 105. The engine 120 can also determine whether or not the profiles need updating (and can regularly update them over time). If so, the engine 120 can update 410 the profiles over time to include new usage patterns. The profiles are then used by the content engine 121 in estimating content on a private site, as explained below.

Figure 5:
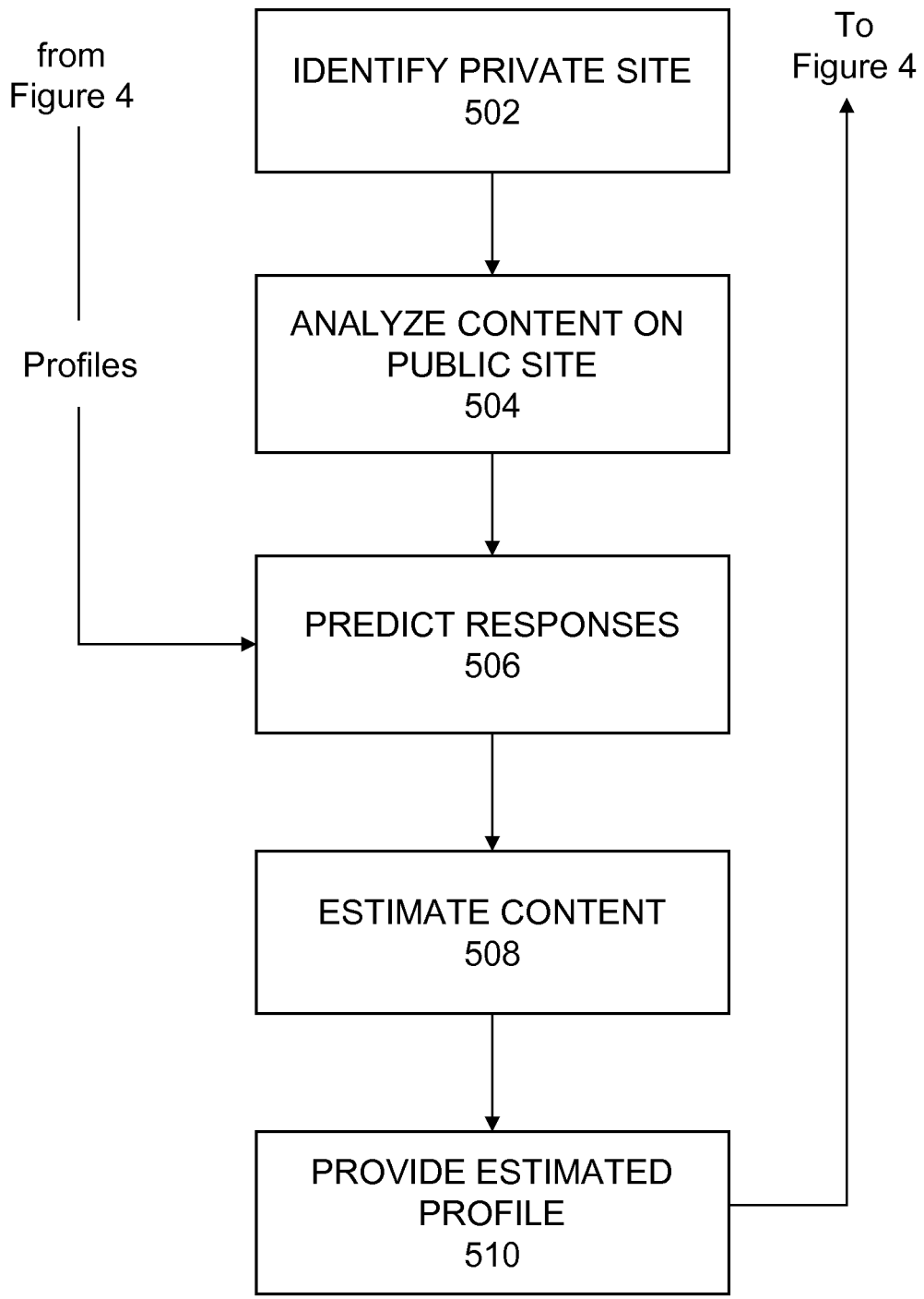
FIG. 5 is a flowchart illustrating steps of the content engine 121 performed to estimate content in a private site, according to one embodiment of the present invention.

Referring now to FIG. 5, there is shown a flowchart illustrating the operation of the content engine 121 in detecting spam using the usage profiles, according to some embodiments of the present invention. The content engine 121 identifies 502 a private site of a private member of a social networking group to be analyzed. The engine 121 analyzes 504 content posted by the private member on public sites of public members of the social networking group. In some embodiments, the engine 121 reviews conversations that the private member is having with the public members, and the engine 121 can then determine topics of the conversations. The topics of the conversations indicate the type of content likely included in responses from the public members on the private site. The analysis 504 of the private member's responses can generally provide insight into what types of things that private member says, how much the member writes, how much information the member reveals, etc.

The engine 121 predicts 506 responses of the public members to the content posted by the private member based on member usage profiles of each of the public members. In some embodiments, the engine 121 reviews the member usage profiles for the public members indicating the amount of content typically posted by each of the public members on other sites. The engine 121 can also determine, based on this review, the amount of content likely included in the responses of the public members posted on the private site. As explained above, prediction 506 based on the member usage profile can provide various types of information about those members, their writing styles, topics, lengths, times, etc. The engine 121 can also obtain information about the private site by reviewing group or global usage profiles created by the profiling engine 120. For example, the engine can review global usage profiles indicating patterns of posting content by users of a social networking environment, and then use this information to determine the content likely included on the private site The engine 121 then estimates 508 the content (e.g., type and amount of content) posted on the private site based on the analysis 504 of the public sites and the prediction 506 based on the member usage profiles. In one embodiment, the engine 121 clusters together conversations between the members of the social networking group. The engine 121 can also statistically analyze the clustered conversations for topics of discussion and the amount of information shared in the conversations.

In some embodiments, the engine 121 also provides 510 the estimated site for the private member, which can then be stored 408 in the profile database 105. For example, the engine 121 can provide 510 the estimated site or a report of the estimated site (or its content) to the supervisor or parents of the private site owner, to the social networking website, to a security management service, or other entity that will use the estimation of the private site. The engine 121 can thus can thus build and display an estimated site for a private member, such as Amy, including an estimation of type and amount of content included in Amy's site.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

I claim:

1. A computer-implemented method of estimating content of a private site on a social networking website, the method comprising:
    identifying, by a computer, a private site of a private member of a social networking group to be analyzed, the social networking group having a plurality of members, the private site being accessible by one or more members of the social networking group based on permission of the private member of the private site and not accessible to the computer;
    accessing, by the computer, content posted by the private member on public sites of public members of the social networking group, a public site of the public members being accessible by anyone who visits the public site;
    identifying, by the computer, for the public members of the social networking group, member usage profiles indicating content-writing patterns of the public members in posting content on public sites of other members over a period of time, a member profile for a public member indicating what content and how much content the member typically provides on public sites;
    predicting, by the computer, responses of the public members posted on the private site in response to the content posted by the private member based on the public members' member usage profiles, the prediction indicating what content and an amount of content on the private site posted by each of the public members; and
    building, by the computer, an estimated private site for the private member based on the predicted responses of the public members, the estimated private site indicating an estimation of an amount of content on the private site posted by each of the public members and an estimation of a type of content on the private site.

2. The method of claim 1, further comprising:
    mapping the social networking group having the plurality of members by identifying one or more users who make up the social networking group;
    determining the patterns of publishing activity of each of the members in posting content on the public sites of other of the members over a period of time; and
    defining the member usage profiles for each of the members based on the determination of the patterns of publishing activity.

3. The method of claim 1, wherein accessing the content posted by the private member on public sites of public members further comprises:
    reviewing conversations that the private member is having with the public members; and
    determining topics of the conversations, the topics indicating a type of content likely included in responses from the public members on the private site.

4. The method of claim 1, wherein predicting responses of the public members further comprises:
    reviewing the member usage profiles for the public members indicating an amount of content typically posted by each of the public members on other sites; and
    based on the review, determining the amount of content likely included in the responses of the public members posted on the private site.

5. The method of claim 1, wherein building the estimated private site further comprises:
    clustering together conversations between the members of the social networking group; and
    statistically analyzing the clustered conversations for topics of discussion and amount of information shared in the conversations.

6. The method of claim 1, wherein building the estimated private site further comprises determining a median level of conversations amongst public members of the group, categories of information included in the conversations, and a number of bytes, images, or objects included in the public sites.

7. The method of claim 1, wherein further comprising providing a report of the estimated private site to a supervisor of the private member.

8. A non-transitory computer-readable storage medium storing executable computer program instructions for estimating content of a private site on a social networking website, the computer program instructions comprising instructions for performing the steps comprising:

identifying a private site of a private member of a social networking group to be analyzed, the social networking group having a plurality of members, the private site being accessible by one or more members of the social networking group based on permission of the private member of the private site and not accessible to the computer;

analyzing content posted by the private member on public sites of public members of the social networking group, a public site of the public members being accessible by anyone who visits the public site;

identifying, by the computer, for the public members of the social networking group, member usage profiles indicating content-writing patterns of the public members in posting content on public sites of other members over a period of time, a member profile for a public member indicating what content and how much content the member typically provides on public sites;

predicting responses of the public members posted on the private site in response to the content posted by the private member based on the public members' member usage profiles, the prediction indicating what content and an amount of content on the private site posted by each of the public members; and building an estimated private site for the private member based on the predicted responses of the public members, the estimated private site indicating an estimation of an amount of content on the private site posted by each of the public members and an estimation of a type of content on the private site.

9. The computer-readable storage medium of claim 8, further comprising:

mapping the social networking group having the plurality of members by identifying one or more users who make up the social networking group;

determining the patterns of publishing activity of each of the members in posting content on the public sites of other of the members over a period of time; and defining the member usage profiles for each of the members based on the determination of the patterns of publishing activity.

10. The computer-readable storage medium of claim 8, wherein accessing the content posted by the private member on public sites of public members further comprises:

reviewing conversations that the private member is having with those public members; and determining topics of the conversations, the topics indicating a type of content likely included in responses from the public members on the private site.

11. The computer-readable storage medium of claim 8, wherein predicting responses of the public members further comprises:

reviewing the member usage profiles for the public members indicating an amount of content typically posted by each of the public members on other sites; and based on the review, determining the amount of content likely included in the responses of the public members posted on the private site.

12. The computer-readable storage medium of claim 8, wherein building the estimated private site further comprises:

clustering together conversations between the members of the social networking group; and statistically analyzing the clustered conversations for topics of discussion and amount of information shared in the conversations.

13. The computer-readable storage medium of claim 8, wherein building the estimated private site further comprises determining a median level of conversations amongst public members of the group, categories of information included in the conversations, and a number of bytes, images, or objects included in the public sites.

14. The computer-readable storage medium of claim 8, further comprising:

determining a pattern of global publishing activity of users in posting content on sites of other users in a social networking environment;

defining a global usage profile for the social networking environment based on the determination; and predicting responses of the public members to the content posted by the private member based on the global usage profile for estimating content posted on the private site.

15. A computer system for estimating content of a private site on a social networking website, the system comprising:

a non-transitory computer-readable storage medium storing executable software modules for performing steps comprising:

identifying a private site of a private member of a social networking group to be analyzed, the social networking group having a plurality of members, the private site being accessible by one or more members of the social networking group based on the permission by the private member of the private site and not accessible to the computer;

analyzing content posted by the private member on public sites of public members of the social networking group, a public site of the public members being accessible by anyone who visits the public site;

identifying, by the computer, for the public members of the social networking group, member usage profiles indicating content-writing patterns of the public members in posting content on public sites of other members over a period of time, a member profile for a public member indicating what content and how much content the member typically provides on public sites;

predicting responses of the public members posted on the private site in response to the content posted by the private member based on the public members' member usage profiles, the prediction indicating what content and an amount of content on the private site posted by each of the public members;

building an estimated private site for the private member based on the predicted responses of the public members, the estimated private site indicating an estimation of an amount of content on the private site posted by each of the public members and an estimation of a type of content on the private site; and a processor configured to execute the software modules stored by the non-transitory computer readable storage medium.

16. The system of claim 15, further comprising:

mapping the social networking group comprising the plurality of members by identifying one or more users who make up the social networking group determining the patterns of publishing activity of each of the members in posting content on the public sites of other of the members over a period of time; and defining the member usage profiles for each of the members based on the determination of the patterns of publishing activity.

17. The system of claim 15, wherein accessing the content posted by the private member on public sites of public members further comprises:

reviewing conversations that the private member is having with those public members; and determining topics of the conversations, the topics indicating a type of content likely included in responses from the public members on the private site.

18. The system of claim 15, wherein predicting responses of the public members further comprises:

reviewing global usage profiles indicating patterns of posting content by users of a social networking environment that includes the social networking group; and based on the review, determining the content likely included on the private site.

19. The system of claim 15, wherein building the estimated private site further comprises determining a median level of conversations amongst public members of the group, categories of information included in the conversations, and a number of bytes, images, or objects included in the public sites.

20. The system of claim 15, wherein building the estimated private site further comprises providing a report of the estimated private site to a supervisor of the private member.

* * * * *